Inventors
RODNEY H. CORNISH
LAWRENCE A. FINLAYSON
D. James Bader
Attorney

United States Patent Office 3,476,281
Patented Nov. 4, 1969

3,476,281
REACTION FRAME FOR RESTRAINING
HIGH LOADS
Rodney H. Cornish, Chicago Heights, and Lawrence A. Finlayson, Park Forest, Ill., assignors to IIT Research Institute, Chicago, Ill., a not-for-profit corporation of Illinois
Filed Dec. 4, 1967, Ser. No. 687,891
Int. Cl. B65d 25/20, 7/44
U.S. Cl. 220—3                                           7 Claims

ABSTRACT OF THE DISCLOSURE

A reaction frame for restraining uniaxial loads. The components of the frame include two opposed stacks of semicircular plates and an outer wrapping of metal strip continuously wound to restrain the movement of the flat edges of the two stacks of plates away from each other. The frame may be employed in conjunction with pressure vessels or presses.

---

Figure 1:
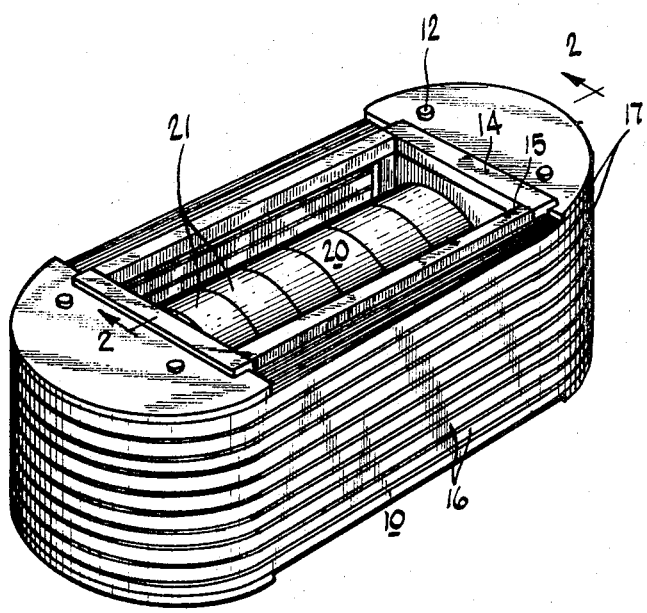

This invention relates generally to apparatus for restraining uniaxial loads.

Apparatus for restraining high static or dynamic loads is necessary in the fields of presses and high pressure chambers. In the field of high pressure chambers or vessels, one piece vessels large enough and strong enough to withstand the pressures which certain applications require would be too large and too heavy for handling and shipping. The segmented pressure vessel made up of coaxially abutting rings of metal and two end plates was developed to solve the problem of transportation and additional problems of fabrication for large sizes of pressure vessels. Such segmented pressure vessels are capable of withstanding high circumferential stresses in each ring. They are not, however, well adapted to withstand the longitudinal loads caused by pressure on the closure as were the old unitary construction pressure vessels. In order for the segmented vessel to operate, some means of end restraint is employed to carry the longitudinal loads which tend to separate the rings from each other.

One prior art method of end restraint for segmented pressure vessels involves welding of segments to each other and attaching the end plates to the outer rings at each end of the vessel. This approach is not satisfactory from the standpoint of strength since each weld must withstand the entire longitudinal load.

Another method of providing longitudinal restraint employs a series of tie rods arranged circumferentially on the pressure vessel to urge the end plates toward the rings. For high pressures, the tie rod restraint involves a great amount of high strength steel, and does not permit easy removal of the end plates after the pressure is removed.

A more satisfactory means of end restraint is provided by a reaction frame which consists of some form of continuous frame of material extending longitudinally along and across the ends of the pressure vessel and acting to hold the cover plates of the pressure vessel in place. The disadvantages of the known reaction frames are two-fold. First, there is a size limitation on the frame which extends along the outside of the pressure vessel and across the ends. The size limit is based on the maximum size steel plate available for cutting such frames. Secondly, the stress concentrations at the corners of such frames are sufficiently high to necessitate a great amount of material which would not be necessary if the corners causing the stress concentration could be eliminated. An example of this type of end restraint is shown in United States Patent No. 2,360,391.

The principal object of the present invention is to provide an improved reaction frame.

Another object of the present invention is to provide a reaction frame which uses material efficiently and economically.

A further object of this invention is to provide a reaction frame having an improved stress concentration factor.

Still a further object of the present invention is to provide an improved reaction frame and segmented pressure vessel.

Figure 2:
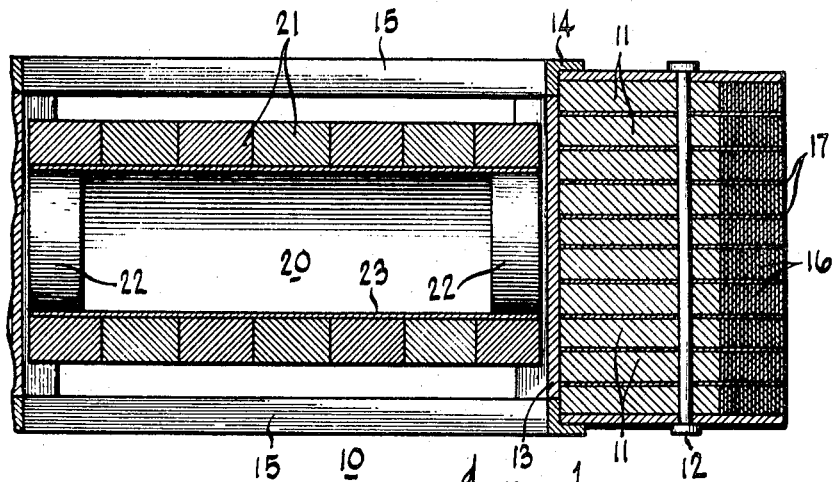

These and other objects of the present invention will be more clearly understood in connection with the preferred embodiments and by reference to the following detailed description in connection with the drawings, wherein:

FIGURE 1 is a perspective view of a preferred embodiment of the invention; and
FIGURE 2 is a partial cross section taken along line 2—2 of the embodiment shown in FIGURE 1.

Briefly with reference to FIGURE 1 the preferred embodiment teaches a reaction frame 10 shown with a pressure vessel 20 in the center. The pressure vessel is made up of a series of circular rings 21. The rings coaxially positioned in abutting relationship to form a cylinder. Cover plates 22 shown in FIGURE 2 are inserted at each end of the cylinder. Each cover plate 22 is circular in cross section and fits inside the cylinder formed by rings 21 much like a piston in an internal combustion engine. Cover plates 22 are provided with suitable sealing means to prevent leakage of fluids from the pressure vessel 20. A series of semicircular end plates 11 are placed at either end of the pressure vessel 20. Each series of plates 11 is held as a unit by tie rods or bolts 12. A bearing plate 13 is provided between each cover plate and its associated series of end plates so that the bearing surface against each pressure vessel cover plate 22 is flat. The two series of semicircular plates 11 are held in spaced relation by the use of pretension spacers 14 and 15. A strip 16 is wound around the outside of each plate 11 in continuous fashion and without any substantial pretensioning.

In operation with pressure vessel 20 the cover plates 22 of the pressure vessel move outwardly as the internal pressure is increased until they engage the bearing plates 13. The force on the bearing plates 13 is transmitted through the end plates 11 resulting in tensioning the wrapped strips 16.

As described briefly above, in the embodiment of FIGURE 1 the reaction frame 10 is shown in conjunction with a pressure vessel 20 of the segmented variety. The pressure vessel is made up of a series of rings 21 placed end to end in abutting coaxial relationship as is best shown in FIGURE 2. These rings 21 are preferably made of a high strength material such as an alloy steel and the thick enough to withstand a high circumferential load. The rings are sealed at their joints by some means such as a bridging liner or seal rings. In the preferred embodiment the rings are sealed by a bridging liner 23 made of steel. The liner forms a cylinder against the rings 21. A high strength seal is not necessary with the disclosed configuration since there is little longitudinal load placed on the rings 21. The assembled rings 21 and liner 23 form a hollow cylinder the inside of which becomes the pressure chamber.

As is best shown in FIGURE 2 the ends of the pressure chamber are sealed by two cover plates 22. These cover plates are preferably circular discs made of high strength steel. The diameter of the cover plates 22 is just slightly less than the inside diameter of the rings 21. A seal is maintained between the outer edge of the cover plates 22 and the inner surface of the bridging liner 23 by means of a resilient gasket not shown. The type of gasket employed is not critical to the operation of the vessel 20. Most known seals could be satisfactorily employed. An inlet (also not shown) in cover plate 22 of the pressure vessel 20 is provided for increasing the pressure in the chamber.

As the pressure increases the two cover plates 22 act as pistons and move outwardly until they are restrained. The outward movement of the cover plates 22 is, as shown in FIGURE 2, restrained by the reaction frame 10. The cover plates initially contact the bearing plates 13 respectively disposed on either end of the cylinder. The bearing plates 13 are generally rectangular and are of sufficient size to extend and distribute the force of the pressure vessel cover plates 22 across the series of end plates 11 described hereinafter. The thickness of the bearing plates 13 is primarily determined by the load which they distribute across the series of end plates 11. The main purpose of using such bearing plates is to avoid the uneven surface provided by edges of the series of end plates 11.

In the preferred embodiment each of the end plates 11 is made up of one or more semiconductor pieces of metal. Other curved shapes such as semielliptical are, however, within the scope of the invention. Each end plate designated 11 may be made up of one or more metal plates stacked side by side or from wedge shaped segments suitably joined. Each end plate 11 is of a thickness equal to the desired width of one strip winding 16 described hereinafter. Between each pair of end plates 11 a barrier is formed by a spacing plate 17 in order to keep the strip windings 16 in alignment. As is more clearly shown in FIGURE 2, the end plates 11 are stacked side by side and spacing plates 17 are interspersed at equal intervals. The spacing plates 17 are semicircular pieces of metal having a diameter greater than and a thickness less than the end plates 11. The purpose of the spacing plates 17 will be more clearly understood with reference to the following description of the strip windings 16. The end plates 11 and spacing plates 17 are joined to form a unit by bolts or tie rods 12. Each unit has a flat face formed by the aligned flat edges of the end plates 11 and spacing plates 17. One such unit is placed at each end of the pressure vessel 20 or alternatively at opposite ends of a pretensioning spacer frame as shown at 14 and 15.

Several metal strip windings 16 are then wrapped in an oval fashion continuously from a starting point on one end of the entire assembly. Each strip winding 16 is wrapped upon itself up to a predetermined thickness after which the outer end is affixed to itself by suitable means such as welding. Each strip winding 16 at its inner surface lies in frictional contact along substantially the entire curved surface formed by the edges of end plates 11. The initial winding of the metal strip winding 16 onto end plates 11 is done without appreciable tension being applied to the metal strip winding. The winding tolerance is determined only by the requirement that the windings be of the proper length to restrain the cover plates 22 so that they will not move free of the cylinder formed by the pressure vessel 20. Tension is later applied by the cover plates 22 of the pressure vessel 20 moving outwardly as pressure is applied. Several bundles of strip winding 16 are provided which need not be of a uniform number of turns. The number of turns per bundle can vary according to the load distribution placed on the reaction frame 10. The chief requirements for each strip winding 16 are that it be thin enough to be wound without stress concentration and that it be ductile enough to provide even distribution load under tension.

A greater appreciation of the advantages of the reaction frame disclosed herein may be realized by reference to the following specific example:

A pressure vessel having a 48 inch bore and 86 inch inside working length is used with a working pressure of 20,000 p.s.i. The resulting end load imposed on the reaction frame is 36,200,000 pounds. The semicircular end plates are 105 inches in diameter, 2 inches thick and are torch cut from hot rolled 1045 steel. The large diameter spacer plates are also torch cut from hot rolled 1045 steel of ½ inch thickness. The plates are assembled with one spacer plate every four inches and two smaller plates intervening. Therefore the width of the channel for each strip winding is four inches and is contained by a spacer plate on each side to prevent the strip from sliding sideways. Ten bundles of windings are used for the particular application involved. Each winding consists of a four inch wide strip Cor-ten steel of 14 gauge thickness. This steel is capable of a 22% elongation before failure. The windings are applied with just enough tension to maintain them in the wrapped position. The total weight of the reaction frame without the weight of the pressure vessel is eighty tons. After the reaction frame is lifted into position around the pressure vessel the pressure is increased to working pressure. The windings then yield to a point uniform load is carried by each turn of each bundle.

The preceding example shows some of the features of an embodiment which has been designed for a specific application. An equivalent reaction frame of conventional design would involve approximately three times as much material and would weigh in the neighborhood of 200 tons. The advantage of the reaction frame of the present invention are many. The end plates 11 are subjected almost exclusively to compressive forces without any bending forces. This type of loading eliminates worries about stress concentration points which would be very critical if a bending moment were applied to the plate. Also no precision machining is required and the plates can be torch cut from readily available sheets of material. The irregularities around the periphery of the plates 11 provide a frictional surface which aids in maintaining the stability of winding 16. At the same time they do not interfere with the operation of the reaction frame and there are no machining costs. The plates 11 could easily be cut from four inch plate.

In the event of a failure of one of the windings 16 the remaining windings will absorb the load carried by the defective winding. Repair is easily accomplished by removing the single winding and rewinding the one bundle where it has failed. If one desires to double the working length of the reaction frame shown in FIGURE 1 the only steps necessary are to unwind windings 16, double the length of pretension spacers 14 and 15 and rewind the same winding 16 on the same end plates 11. No new parts need be purchased to vary the length of the device except additional winding wraps for the increased length.

Another important advantage of the present reaction frame is the relative ease of transportation. In disassembled form the heaviest piece of the reaction frame described in the above example is 5200 pounds. This compares very favorably with prior art reaction frames of much lower capacity. Also every piece of the reaction frame is made from a commercially available item stocked by steel warehouses. The wasted material in producing the semicircular plates is much lower than the waste of most known reaction frame designs.

The reaction frame in the present invention has been shown in conjunction with a pressure vessel. A further application for this device is in the field of presses. A permanent pretension frame is supplied to hold the reaction frame in an upright position. The moving parts of the press are inserted in the window and the conventional reaction frame of the press is eliminated. This arrangement provides a press having greatly increased capacity over presently available presses without any substantial increases in size. Such increases is again due to the elimination of stress concentrations and bending in the loading of the reaction frame. In addition the size variation possible with the present invention is almost unlimited.

What is claimed is:

1. A reaction frame for restraining high loads in a uniaxial direction comprising,
two spaced end pieces, each end piece having two parallel sides, the boundaries of said parallel sides being defined by a flat face perpendicular to said sides, and a curved surface perpendicular to said sides and intersecting said flat face, said end pieces being disposed with said flat faces in opposing relationship, and a load supporting member including at least one strip of high strength material wrapped upon itself and around said end pieces, the innermost wrap being in contact with said curved surfaces, each wrap of said strip extending around said end pieces and across the space between said end pieces parallel to the direction in which the load is to be applied.

2. The reaction frame defined in claim 1 wherein said curved surfaces are semicircular.

3. The reaction frame defined in claim 1 wherein each of said end pieces includes a plurality of sheets of metal stacked in contact with each other and mechanically attached to form a unit, each of said sheets having a boundary defined by a flat edge and a curved surface intersecting said flat edge.

4. The reaction frame defined in claim 1 wherein said strip is metal.

5. A high pressure apparatus comprising,
a pressure vessel having a hollow chamber, said chamber having openings at two opposing ends,
a cover plate conforming to and movably inserted in each of said openings to provide a closed pressure chamber,
a reaction frame for restraining the outward movement of said cover plates as pressure is applied in said chamber, said reaction frame comprising two spaced end pieces, each end piece having two parallel sides, the boundaries of said parallel sides being defined by a flat face perpendicular to said sides, and a curved surface perpendicular to said sides and intersecting said flat face, each said flat face being disposed adjacent one of said cover plates, and a strip of high strength material wrapped upon itself and around said end pieces, the innermost wrap being in contact with said curved surfaces each wrap of said strip extending around said end pieces and across the space between said end pieces parallel to the side of said pressure vessel.

6. The high pressure apparatus defined in claim 5 wherein the hollow chamber is cylindrical.

7. The reaction frame defined in claim 3 wherein each of said end pieces further includes a plurality of spacing plates interleaved between one or more of said sheets at predetermined intervals, each of said spacing plates having a flat edge aligned with the flat edge of said sheets to form part of said flat face, each of said spacing plates also having a curved edge of greater radius than the curved edges of said sheets, whereby grooves are formed in said end pieces for receiving said strips of high strength material and for maintaining said strips in proper alignment on the curved surfaces of said sheets.

References Cited

UNITED STATES PATENTS

| | | | |
|---|---|---|---|
| 2,109,529 | 3/1938 | Goddard | 220—3 |
| 2,360,391 | 10/1944 | Birchall | 220—3 |
| 3,329,297 | 7/1967 | Jordan | 220—63 XR |
| 3,339,787 | 9/1967 | Pechacek. | |

RAPHAEL H. SCHWARTZ, Primary Examiner

U.S. Cl. X.R.

220—71